US007897026B2

(12) United States Patent
Chou et al.

(10) Patent No.: US 7,897,026 B2
(45) Date of Patent: Mar. 1, 2011

(54) FLUID PARTICLE SEPARATING DEVICE

(75) Inventors: Chung-Cheng Chou, Taoyuan County (TW); Wai William Wang, Taoyuan County (TW)

(73) Assignee: Raydium Semiconductor Corporation, Hsinchu (TW)

(*) Notice: Subject to any disclaimer, the term of this patent is extended or adjusted under 35 U.S.C. 154(b) by 845 days.

(21) Appl. No.: 11/830,879

(22) Filed: Jul. 31, 2007

(65) Prior Publication Data

US 2008/0067059 A1 Mar. 20, 2008

(30) Foreign Application Priority Data

Sep. 18, 2006 (TW) .............................. 95134494 A

(51) Int. Cl.
*G01N 27/26* (2006.01)
*G01N 27/453* (2006.01)
*B07C 5/02* (2006.01)
*B03C 5/02* (2006.01)

(52) U.S. Cl. ....................... 204/547; 435/325; 209/552; 209/210; 204/643; 204/600

(58) Field of Classification Search ................. 204/547, 204/552, 242, 600–643; 435/325; 209/210, 209/552
See application file for complete search history.

(56) References Cited

U.S. PATENT DOCUMENTS 6,221,654 B1 * 4/2001 Quake et al. ............. 435/287.3
6,481,453 B1 * 11/2002 O'Connor et al. ........ 137/15.04
6,524,456 B1 * 2/2003 Ramsey et al. .............. 204/450
2004/0108479 A1 * 6/2004 Garnier et al. ......... 251/129.01
2006/0286549 A1 * 12/2006 Sohn et al. ...................... 435/5
2007/0151855 A1 * 7/2007 Schnelle et al. ............. 204/547
2009/0148937 A1 * 6/2009 Schnelle et al. ............. 435/325

FOREIGN PATENT DOCUMENTS

WO WO 2005075958 * 8/2005
WO WO 2006053892 * 5/2006

* cited by examiner

*Primary Examiner*—Alexa D Neckel
*Assistant Examiner*—Jennifer Dieterle
(74) *Attorney, Agent, or Firm*—Thomas | Kayden

(57) ABSTRACT

A fluid particle-separating device includes a sorting, first and second diverting channels, a detector, a microprocessor, first and second actuators, and first and second sieving valves. The sorting channel receives fluid containing first and second particles. The first and second diverting channels guide the first and second particles. The detector recognizes the sizes and numbers of the first and second particles and outputs first and second recognition signals. The microprocessor receives the first and second recognition signals and outputs first and second control signals. The first and second sieving valves respectively inside the first and second diverting channels allow the particles to pass through or not. The first actuator receives the first control signal and controls the deformation of the second sieving valve to block the first particle. The second actuator receives the second control signal and controls the deformation of the first sieving valve to block the second particle.

15 Claims, 10 Drawing Sheets

FLUID PARTICLE SEPARATING DEVICE

This application claims the benefit of Taiwan application Serial No. 95134494, filed Sep. 18, 2006, the subject matter of which is incorporated herein by reference.

BACKGROUND OF THE INVENTION

1. Field of the Invention

The invention relates in general to a fluid particle separating device, and more particularly to a fluid particle separating device which sorts the particles of a fluid by recognizing the sizes of the particles and controlling the deformation of the sieving valve.

2. Description of the Related Art

Conventional fluid particle separating device is capable of separating different objects or particles suspended in a fluid by means of determining, sorting and counting the particles of the fluid. Therefore, the fluid particle separating device with sorting and counting functions is widely used in the field of biomedicine for sorting and counting the blood cells or purifying a fluid.

Conventional fluid particle separating device guides the particles of different particle sizes to enter into a predetermined container via the designs relating to electricity or magnetism. However, it is difficult to precisely control the electrical field or the magnetic field according to the size of the particles, so errors are inevitable. Worse than that, in the presence of an external electrical field or magnetic field, the sorting of particles is interfered such that the sorting accuracy is affected. Therefore, new technologies for better and more accurately separating and collecting the particles are needed.

SUMMARY OF THE INVENTION

The invention is directed to a fluid particle separating device which sorts the particles of a fluid by recognizing the sizes of the particles and controlling the deformation of the sieving valve. Moreover, according to the location of the sieving valve of the fluid particle separating device, the characteristics and the sizes of the particles are determined and the impurities in the fluid are filtered out.

According to a first aspect of the present invention, a fluid particle separating device including a sorting channel, a first diverting channel, a second diverting channel, a detector, a microprocessor, a first actuator, a second actuator, a first sieving valve and a second sieving valve is provided. The sorting channel receives a first fluid containing a first particle and a second particle, wherein the first particle and the second particle sequentially pass through the sorting channel. The first diverting channel is connected to the sorting channel for guiding the first particle. The second diverting channel is connected to the sorting channel for guiding the second particle. The detector is disposed around the sorting channel for sequentially recognizing the sizes and numbers of the first particle and the second particle and accordingly outputting a first recognition signal and a second recognition signal. The microprocessor is electrically connected to the detector for sequentially receiving the first recognition signal and the second recognition signal and accordingly outputting a first control signal and a second control signal. The first sieving valve is deformable and disposed inside the first diverting channel for allowing the first particle to pass through the first diverting channel. The second sieving valve is deformable and disposed inside the second diverting channel for allowing the second particle to pass through the second diverting channel. The first actuator is electrically connected to the microprocessor for receiving the first control signal and accordingly controlling the deformation of the second sieving valve such that the first particle cannot pass through the second diverting channel. The second actuator is electrically connected to the microprocessor for receiving the second control signal and accordingly controlling the deformation of the first sieving valve such that the second particle cannot pass through the first diverting channel.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
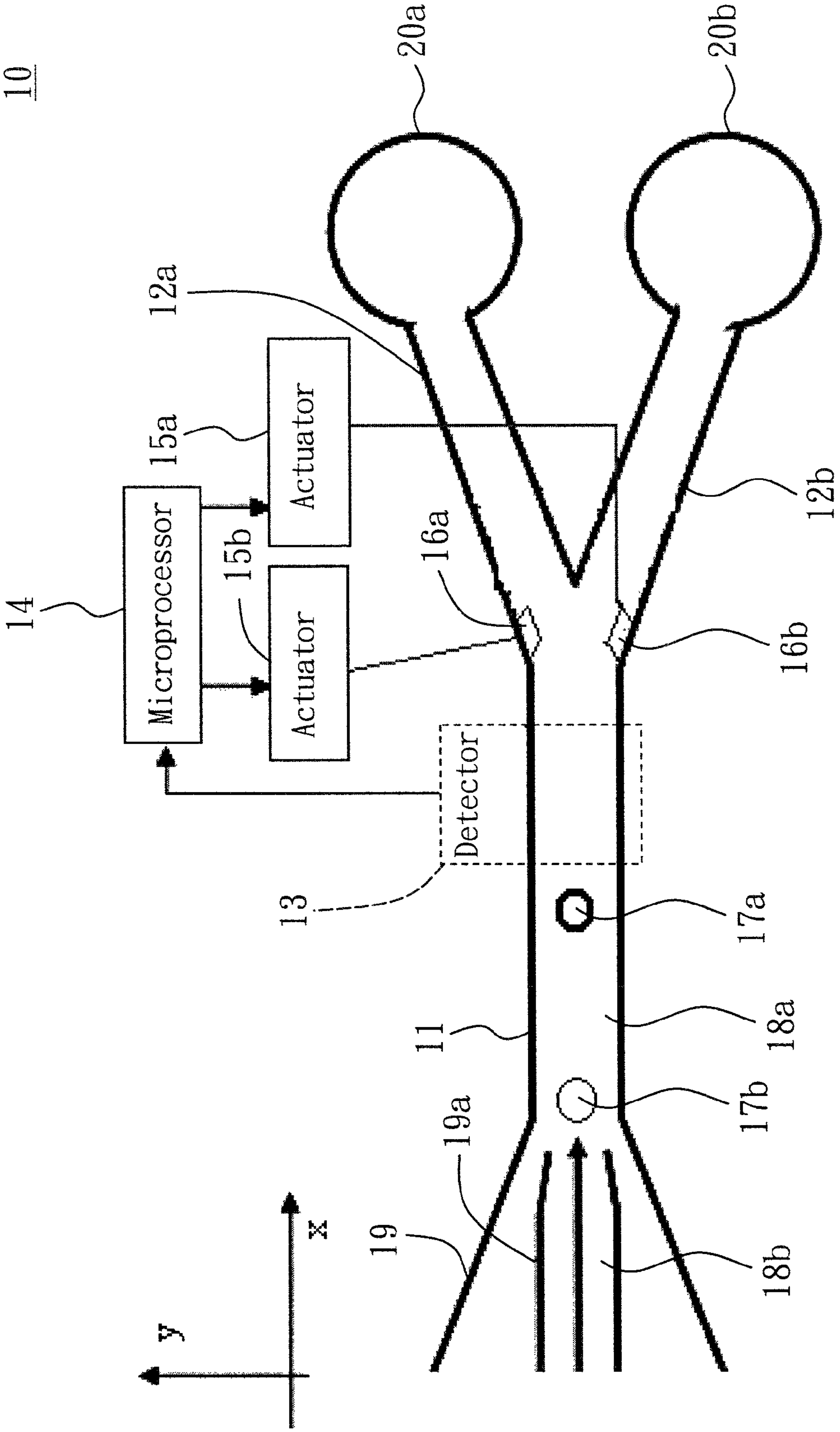
FIGS. 1A~1D are operational diagrams of a fluid particle separating device according to a first embodiment of the invention.

Referring to FIGS. 1A~1D, operational diagrams of a fluid particle separating device according to a first embodiment of the invention are shown. As indicated in FIG. 1A, the fluid particle separating device 10 at least includes a filtering channel 19, a sorting channel 11, two diverting channels 12*a* and 12*b*, a detector 13, a microprocessor 14, two actuators 15*a* and 15*b*, two sieving valves 16*a* and 16*b* and two containers 20*a* and 20*b*. The filtering channel 19 receives and filters a fluid 18*b*, and then outputs a fluid 18*a* that includes at least two particles 17*a* and 17*b*. One end of the sorting channel 11 is connected to the filtering channel 19. The sorting channel 11 is for receiving the fluid 18*b* and guiding the particle 17*a* and 17*b* to sequentially pass through the sorting channel, such that the particles are sequentially arranged one by one and move forward. One ends of the diverting channels 12*a* and 12*b* are respectively connected to the other end of the sorting channel 11, and the other ends of the diverting channels 12*a* and 12*b* are respectively connected to the containers 20*a* and 20*b*. The particles of different sizes are guided to pass through the diverting channels 12*a* and 12*b* and then are collected in the containers 20*a* and 20*b*, so as to achieve the object of sorting and collecting the particles. The fluids 18*a* and 18*b* can be liquid, gas or supercritical fluid.

The entrance of the sorting channel 11 is exactly the connecting end between the sorting channel 11 and the filtering channel 19, and the particles 17*a* and 17*b* of the fluid 18*a* are enabled to enter the sorting channel 11 from the filtering channel 19 sequentially by means of the fluid focus effect. Basically, the structure of the filtering channel 19 is formed by three channels. The fluid 18*b* is injected into the sorting channel 11 via the middle channel 19*a*, and then the fluid 18*a* is outputted, and the sheath fluid is injected into the sorting channel 11 via the other two lateral channels. By appropriately controlling the speed of injecting the fluid into each channel of the filtering channel 19, the sheath fluid filled in the two lateral sides squeezes the fluid 18*a* at the nozzle of the middle channel 19*a* near the sorting channel 11 to generate fluid focus effect. Thus, the range of the fluid 18*a* is narrowed. The faster the sheath fluid flows at the two lateral sides, the more centralized the fluid 18*a* becomes. By appropriately controlling the flowing speed and the squeezing of the sheath fluid from the two lateral sides, the range of the fluid 18*a* is substantially downsized to the width of a single particle, such that the particles 17*a* and 17*b* of the fluid 18*a* are enabled to sequentially enter the sorting channel 11 from the filtering channel 19, thereby producing the effect of sorting single particle. Furthermore, the fluid focus effect is generated when the middle fluid is centralized by the sheath fluid from the two lateral sides and it forces the outflowing width of the middle fluid to be reduced to the expected size of the invention.

The detector 13 is disposed around the sorting channel 11 and forms a detecting area depicted by dotted line in the sorting channel 11 for recognizing the sizes and numbers of the particle passing through. When the particles pass through the detecting area of the detector 13, the detector 13 transforms the instant change of the detecting values into a recognition signal. The instant change of the detecting values arises due to different characteristics between the particles and the fluid (such as conductivity and permittivity). Thus, the determination about whether a to-be-detected particle passes through the detecting area of the detector 13 or not is made. Moreover, the sizes and numbers of the particles passing through the detecting area of the detector 13 can also be determined according to the intensity and number of the recognition signals and used as a reference for subsequent sorting. The microprocessor 14 is electrically connected to the detector 13, and the actuators 15*a* and 15*b* are also electrically connected to the microprocessor 14 respectively. The sieving valves 16*a* and 16*b* are deformable and disposed inside the diverting channels 12*a* and 12*b* respectively. The microprocessor 14 outputs corresponding control signals to at least one of the actuators 15*a* and 15*b* according to the detecting results of the detector 13, thereby controls the deformations of the sieving valves 16*b* and 16*a*. Besides, the deformations of the sieving valves 16*a* and 16*b* are respectively used for determining the dimensions of the diverting channels 12*a* and 12*b*. If the sieving valves 16*a* and 16*b* are disposed inside the diverting channels 12*a* and 12*b* with the volume being expanded or the thickness thereof being increased, then the dimensions of the diverting channels 12*a* and 12*b* will be reduced when the volume of the sieving valves 16*a* and 16*b* is expanded or the thickness thereof is increased. When the size of the sieving valves 16*a* and 16*b* or the thickness thereof remains the same or the sieving valves 16*a* and 16*b* are restored to the original state, then the dimensions of the diverting channels 12*a* and 12*b* will be unchanged or the diverting channels 12*a* and 12*b* will be restored to the original state for allowing the particles to enter the containers 20*a* and 20*b*.

Figure 1B:
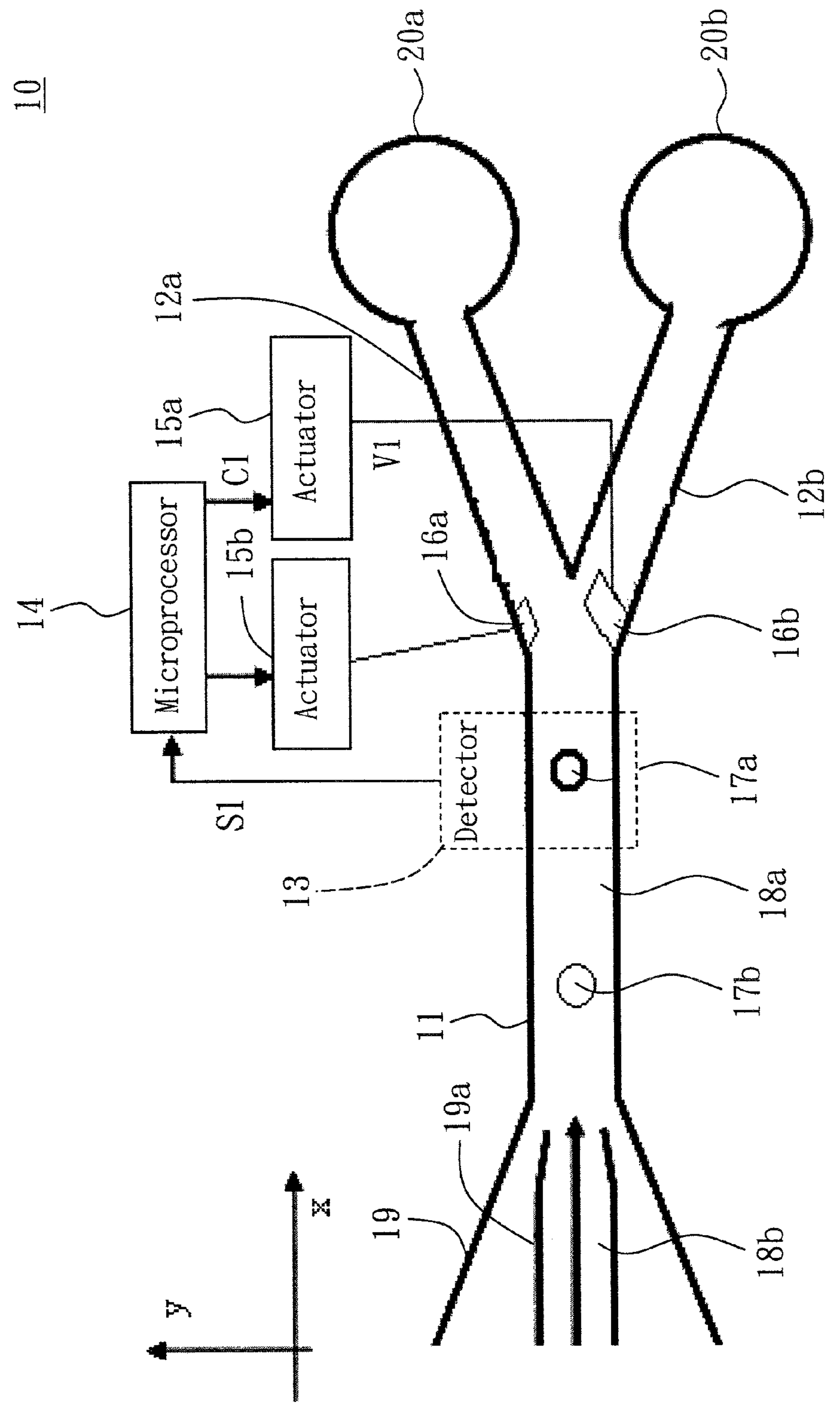

As indicated in FIG. 1B, when the particle 17*a* enters the detecting area of the detector 13 inside the sorting channel 11, the detector 13 recognizes the sizes and numbers of the particle 17*a* by ways of electrical, magnetic or optical method and outputs a recognition signal S1. For example, the detector 13 is a Coulter counter which recognizes the sizes and numbers of the particle by way of electrical method. The optical detecting technology can recognizes the size of the particle according to how much light is shielded or scattered by the particle by projecting the light to the particle. Besides, the detector 13 has a counter for adding the counting number by 1 after the detector 13 recognizes the size of the particle. After the detector 13 detects all of the particles, the counter outputs the total counting number of the particles. The recognition signal S1 contains the information of the size and number of the particle 17*a*. The microprocessor 14 receives the recognition signal S1, and outputs a control signal C1 accordingly. The actuator 15*a* receives the control signal C1 and accordingly controls the deformation of the sieving valve 16*b* such that the particle 17*a* cannot pass through the diverting channel 12*b*. The actuator 15*a* controls the deformation of the sieving valve 16*b* mechanically or by way of electrical signals. In the present embodiment of the invention, the actuator 15*a* is electrically connected to the sieving valve 16*b*, and outputs a voltage V1 to the sieving valve 16*b* after receiving the control signal C1. The sieving valve 16*b* receives the voltage V1 such that the volume of the sieving valve 16*b* is expanded or the thickness is increased, thereby reducing the dimension of the diverting channel 12*b*. Since the size of the particle 17*a* is larger than the dimension of the diverting channel 12*b*, the particle 17*a* cannot pass through the diverting channel 12*b*. Meanwhile, the size or the thickness of the sieving valve 16*a* does not change, so the dimension of the diverting channel 12*a* also remains unchanged for allowing the particle 17*a* whose size is smaller than the dimension of the diverting channel 12*a* to pass through the diverting channel 12*a* and enter the container 20*a*. It is noted that when the particle 17*a* is moving within the detecting area of the detector 13, the detector 13 continues to output the recognition signal S1 to the microprocessor 14, the microprocessor 14 continues to output the control signal C1 to the actuator 15*a*, and the actuator 15*a* continues to output the voltage V1 to the sieving valve 16*b*, such that the volume of the sieving valve 16*b* is expanded or the thickness thereof is increased to such a size that the particle 17*a* cannot pass through the diverting channel 12*b*.

Figure 1C:
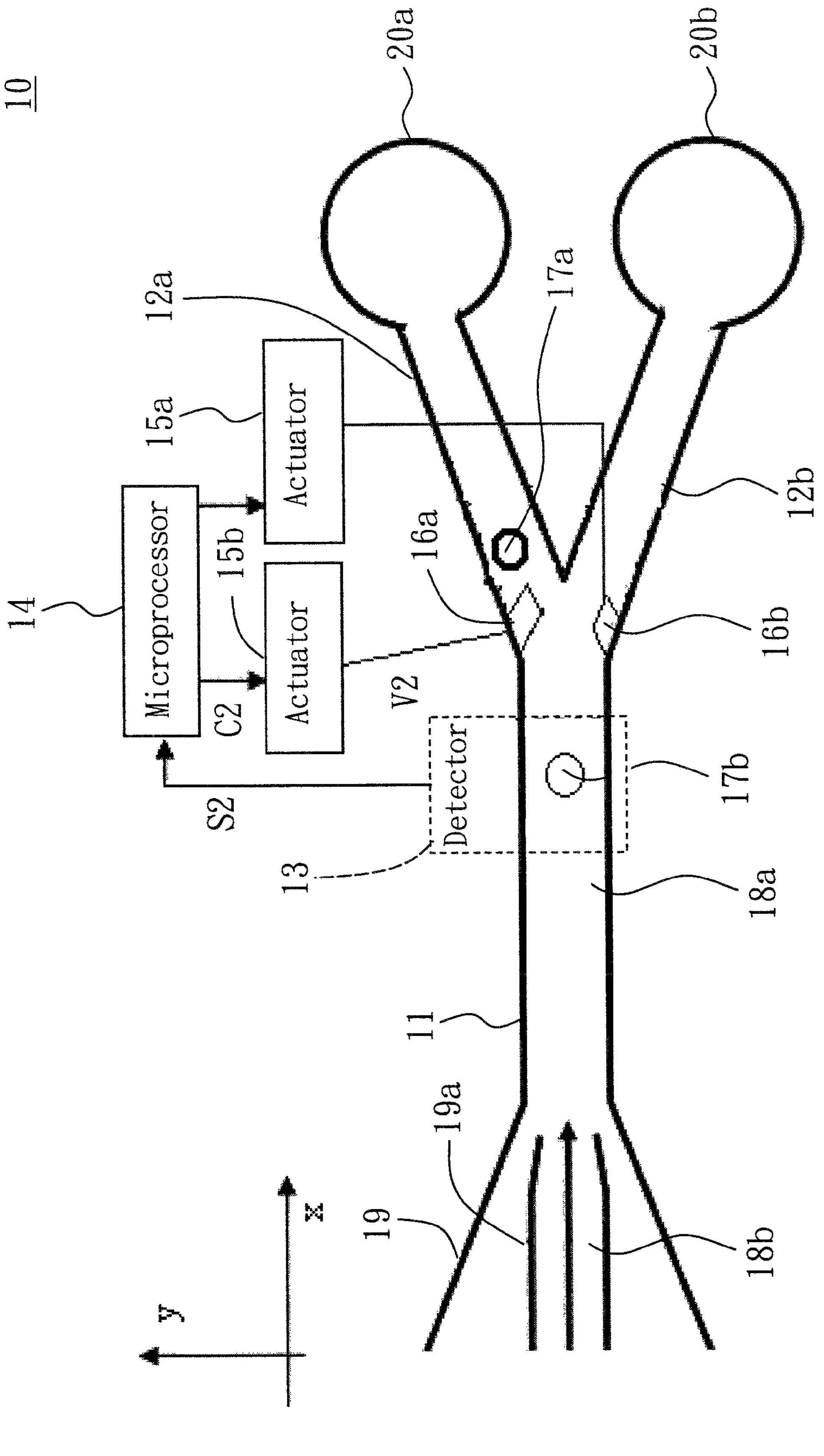

As indicated in FIG. 1C, when the particle 17*a* leaves the detecting area of the detector 13 and the particle 17*b* enters the detecting area of the detector 13, the detector 13 recognizes the size and number of the particle 17*b* and accordingly outputs a recognition signal S2. The recognition signal S2 contains the information of the size and number of the particle 17*b*. The microprocessor 14 receives a recognition signal S2 and outputs a control signal C2 accordingly. The actuator 15*b* receives the control signal C2 and accordingly controls the deformation of the sieving valve 16*a* such that particle 17*b* cannot pass through diverting channel 12*a*. The actuator 15*b* controls the deformation of the sieving valve 16*a* mechanically or by way of electrical signals. In the present embodiment of the invention, the actuator 15*b* is electrically connected to the sieving valve 16*a* and outputs a voltage V2 to the sieving valve 16*a* after receiving the control signal C2. The sieving valve 16*a* receives the voltage V2 such that the volume of the sieving valve 16*a* is expanded or the thickness thereof is increased, thereby reducing the dimension of the diverting channel 12*a*. Since the size of the particle 17*b* is larger than the dimension of the diverting channel 12*a*, the particle 17*b* cannot pass through the diverting channel 12*a*. Meanwhile, the particle 17*a* has left the detecting area of the detector 13 for a while and is ready to enter the container 20*a*, the actuator 15*a* will stop outputting the voltage V1 to the sieving valve 16*b*. Thus, the sieving valve 16*b* will be restored to the state as in FIG. 1A. As the sieving valve 16*b* has restored to the original state, the size of the diverting channel 12*b* will also be restored to the original dimension for allowing the particle 17*b* whose size is smaller than the dimension of the diverting channel 12*b* to pass through the diverting channel 12*b* and enter the container 20*b*. It is noted that when the particle 17*b* is moving within the detecting area of the detector 13, the detector 13 continues to output the recognition signal S2 to the microprocessor 14, the microprocessor 14 continues to output the control signal C2 to the actuator 15*b*, and the actuator 15*b* continues to output the voltage V2 to the sieving valve 16*a*, such that the volume of the sieving valve 16*a* is expanded or the thickness thereof is increased to such a size that the particle 17*b* can not pass through the diverting channel 12*a*.

Figure 1D:
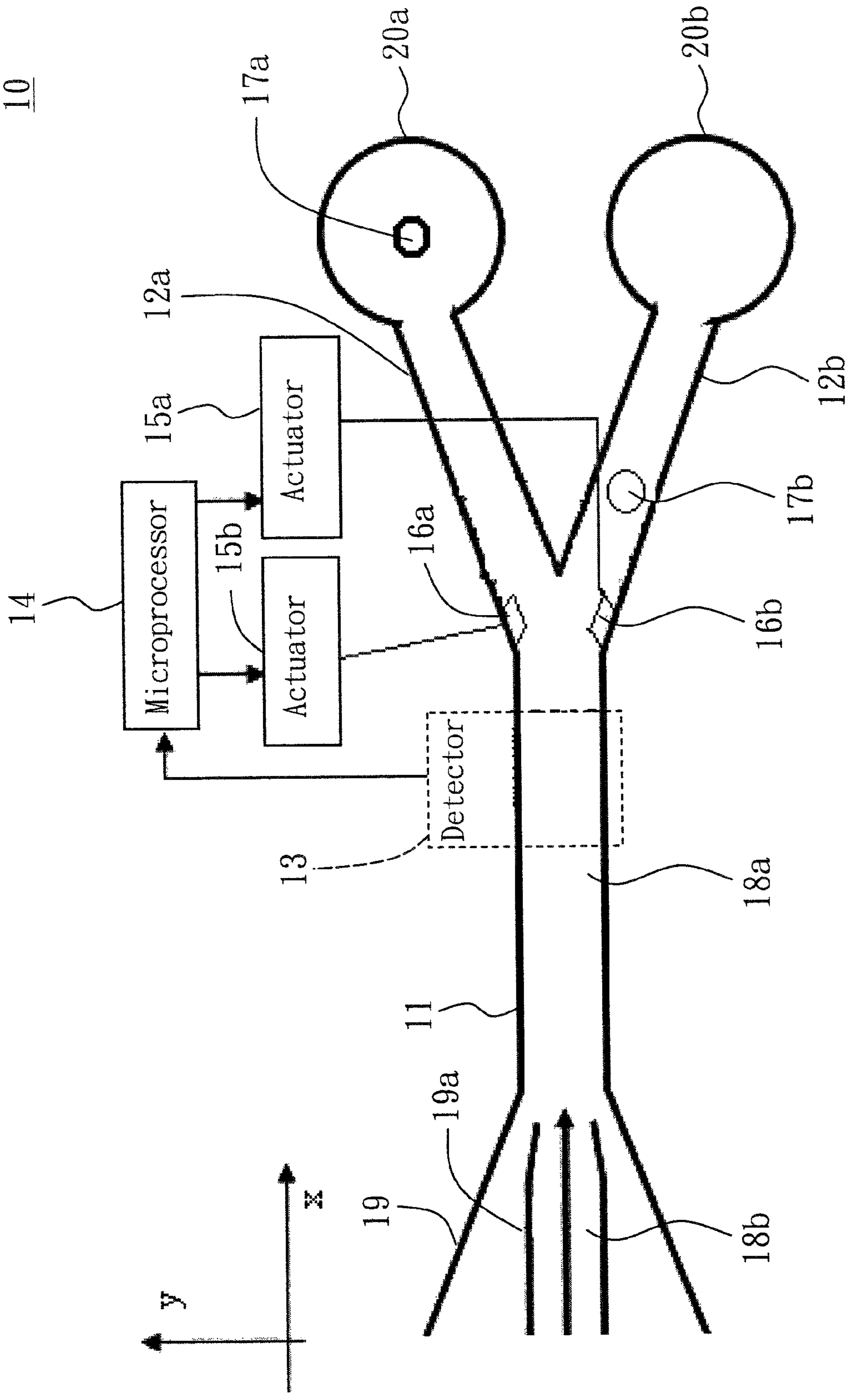

As indicated in FIG. 1D, after the particle 17*b* has left the detecting area of the detector 13 for a while and is ready to enter the container 20*b*, the actuator 15*b* will stop outputting the voltage V2 to the sieving valve 16*a*. Thus, the sieving valve 16*a* will be restored to the state as in FIG. 1A. At last, the particles 17*a* and 17*b* will be collected in the containers 20*a* and 20*b* respectively. After the detector 13 recognizes the sizes of the particles 17*a* and 17*b*, the detector 13 outputs a counting value of the particle that is equal to 2.

Figure 2C:
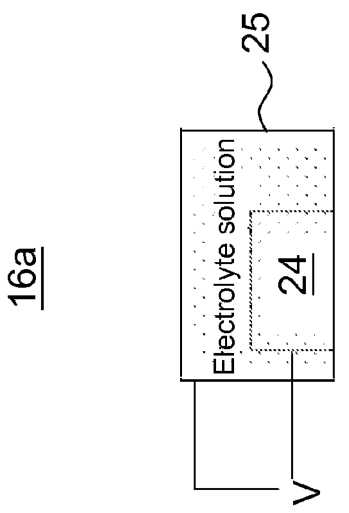
FIG. 2C is a structural diagram of a third sieving valve of the invention.

The structural design of the sieving valves 16*a* and 16*b* is exemplified by the sieving valve 16*a* with accompanied drawings. However, the technology of the present embodiment of the invention is not limited thereto. Referring to FIG. 2A, a structural diagram of a first sieving valve of the invention is shown. As indicated in FIG. 2A, the sieving valve 16*a* includes a conductive macromolecule layer 21 and an electrolytic layer 22. The conductive macromolecule layer 21 is disposed next to the electrolytic layer 22. The voltage V is applied onto the conductive macromolecule layer 21 and the electrolytic layer 22 for moving the ions of the electrolytic layer 22 to the conductive macromolecule layer 21. Thus, the conductive macromolecule of the conductive macromolecule layer 21 will form a covenant bond with the ions, such that the volume of the conductive macromolecule layer 21 is expanded or the thickness thereof is increased. The above reaction is expressed as follows:

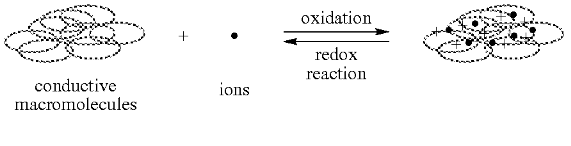

The deformation of the conductive macromolecule layer 21 is stated below. During the redox reaction of the conductive macromolecule, the original structure of the conductive macromolecule interacts with external ions to form a covenant bond, thereby causing the volume or the thickness of the conductive macromolecule layer 21 to change. In the present embodiment of the invention, the conductive macromolecule layer 21 is made from an electro-deformable macromolecule material such as a conjugate conductive macromolecule material including polypyrrole (PPy), polyaniline (PAn), polysulfone or polyacetylene (PAc). Besides, the electrolytic layer 21 includes dodecylbenzene sulfonic acid ions, perchloric acid ions and benzene sulfonic acid ions. The electrolytic layer 21 can be made from a solid material or a fluid.

Despite the sieving valves 16*a* and 16*b* of the present embodiment of the invention are exemplified by a conductive macromolecule material whose volume is expanded or thickness is increased when receiving a voltage, however the technology of the present embodiment of the invention is not limited thereto. For example, the sieving valves 16*a* and 16*b* can be made from an elastic deformable material, and the actuators 15*a* and 15*b* correspondingly control the deformation of the sieving valves 16*b* and 16*a* respectively by use of static electricity, high voltage or magnetic electricity.

Figure 2B:
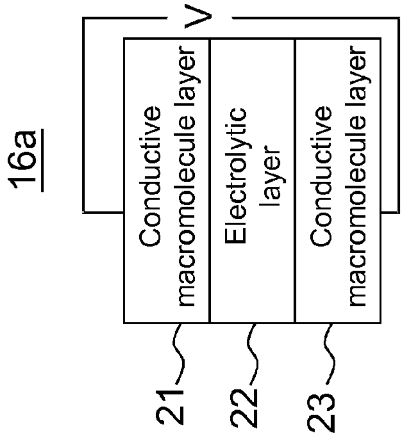
FIG. 2B is a structural diagram of a second sieving valve of the invention.
Figure 2A:
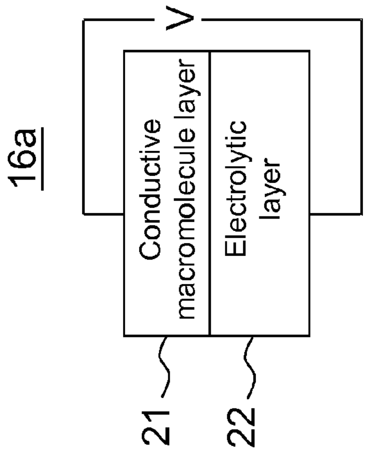
FIG. 2A is a structural diagram of a first sieving valve of the invention.

Referring to FIG. 2B, a structural diagram of a second sieving valve of the invention is shown. As indicated in FIG. 2B, the sieving valve 16*a* includes two conductive macromolecule layers 21 and 23 as well as the electrolytic layer 22, wherein the electrolytic layer 22 is sandwiched by the conductive macromolecule layers 21 and 23. The voltage V is applied onto the conductive macromolecule layers 21 and 23 for moving the ions of the electrolytic layer 22 to the conductive macromolecule layers 21 or 23. Thus, the conductive macromolecules of the conductive macromolecule layer 21 or 23 will form a covenant bond with ions, such that the volume of the conductive macromolecule layers 21 or 23 is expanded or the thickness is increased. The conductive macromolecule layer 23 includes polypyrroles (PPy), polyaniline, polysulfone (PS) and polyacetylene.

Referring to FIG. 2C, a structural diagram of a third sieving valve of the invention is shown. As indicated in FIG. 2C, the sieving valve 16a includes a conductive macromolecule layer 24 and an electrolyte solution 25, wherein the conductive macromolecule layer 24 is embedded in the electrolyte solution 25 that has no contact with the fluid 18*a*. The voltage V is applied onto the conductive macromolecule layer 24 and the electrolyte solution 25 for moving the ions of the electrolyte solution 25 to the conductive macromolecule layer 24. Thus, the conductive macromolecule of the conductive macromolecule layer 24 will form a covenant bond with the ions, such that the volume of the conductive macromolecule layer 24 is expanded or the thickness thereof is increased. The conductive macromolecule layer 24 includes polypyrrole (PPy), polyaniline (PAn), polysulfone or polyacetylene (PAc). The electrolyte solution 25 includes dodecylbenzene sulfonic acid ions, perchloric acid ions or benzene sulfonic acid ions, and can be a non-neutral fluid. As for the sieving valve 16*b*, it can be the same as the design in FIGS. 2A~2C. However, the sieving valves 16*a* and 16*b* can be the same or different design.

Figure 3:
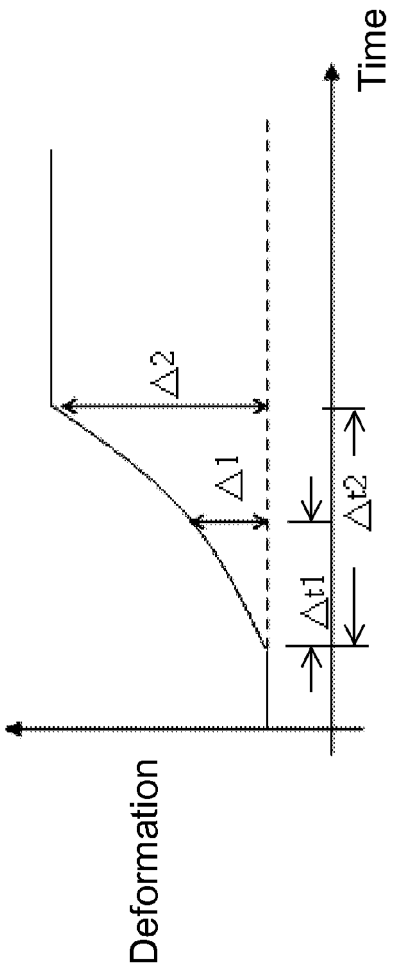
FIG. 3 is a deformation vs. time relationship diagram of a conductive macromolecule layer of the invention.

If the conductive macromolecule layer of the sieving valves 16*a* and 16*b* has a slow reaction in electro-deformation, for example, in the deformation vs. time relationship diagram of FIG. 3, there is a deformation Δ1 during a time period Δt1, and generating the whole deformation Δ2 requires a time period of Δt2. In the present embodiment of the invention, to go with the design of the width of the channels 12*a* and 12*b*, only the deformation Δ1 of the conductive macromolecule is required for controlling the sieving valves 16*a* and 16*b* and increasing the operating frequency of the sieving valves 16*a* and 16*b*.

Figure 4B:
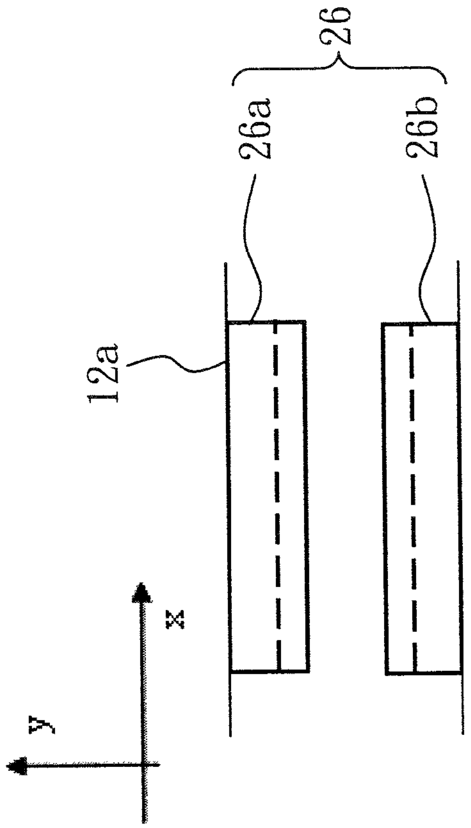
FIG. 4B is a diagram of the sieving valve of FIG. 4A after being deformed.
Figure 4A:
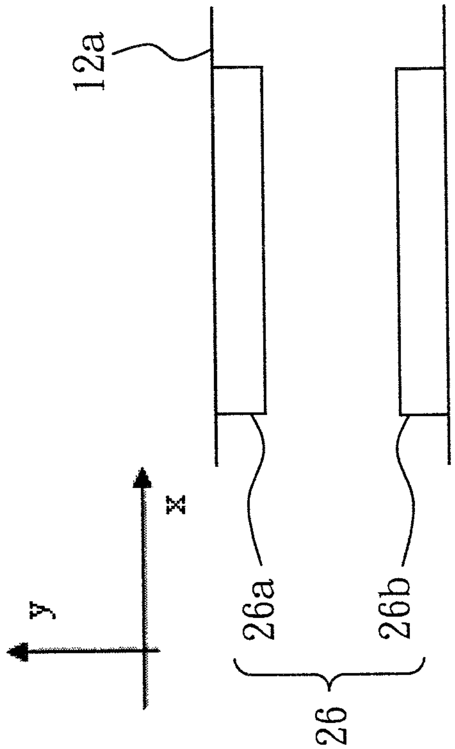
FIG. 4A is a structural diagram of a sieving valve of the invention with two valve portions.

Moreover, the thinner the conductive macromolecule layer, the faster the conductive macromolecule layer is deformed. Thus, the structures of the sieving valves 16*a* and 16*b* can be changed into other structures that are two vertically stacked and double-layered as indicated in the sieving valve 26 of FIG. 4A~4B for increasing the reaction rate of deformation. In FIGS. 4A~4B, the sieving valve 26 includes two valve portions 26*a* and 26*b* correspondingly disposed inside the channel 12*a* and electrically connected to the actuator 15*b* of FIG. 1A. When the valve portions 26*a* and 26*b* receive a voltage, the volume of the valve portions 26*a* and 26*b* is expanded or the thickness thereof is increased, such that the width of the channel 12*a* is largely reduced by slightly deforming the valve portions 26*a* and 26*b*. Besides, the sieving valve 26 can be disposed inside the channel 12*b* to replace the sieving valve 16*b*. The valve portions 26*a* and 26*b* can be a double-layered structure formed by the conductive macromolecule layer and the electrolytic layer, a three-layered structure formed with an electrolytic layer being sandwiched by two conductive macromolecule layers or a structure formed with a conductive macromolecule layer being embedded in the electrolyte solution. The valve portions 26*a* and 26*b* can have the same or different structures. For example, the valve portion 26*a* includes a first conductive macromolecule layer and a first electrolytic layer, but the valve portion 26*b* includes a second conductive macromolecule layer and a second electrolytic layer similar to the structure indicated in FIG. 2A. The first conductive macromolecule layer and the first electrolytic layer are disposed opposite to the second conductive macromolecule layer and the second electrolytic layer. The actuator 15*b* of FIG. 1A is for outputting a voltage to the first conductive macromolecule layer and the first electrolytic layer as well as the second conductive macromolecule layer and the second electrolytic layer for controlling the deformation of the valve portions 26*a* and 26*b* respectively. The valve portions 26*a* and 26*b* can be made from an elastic deformable material.

Figure 5A:
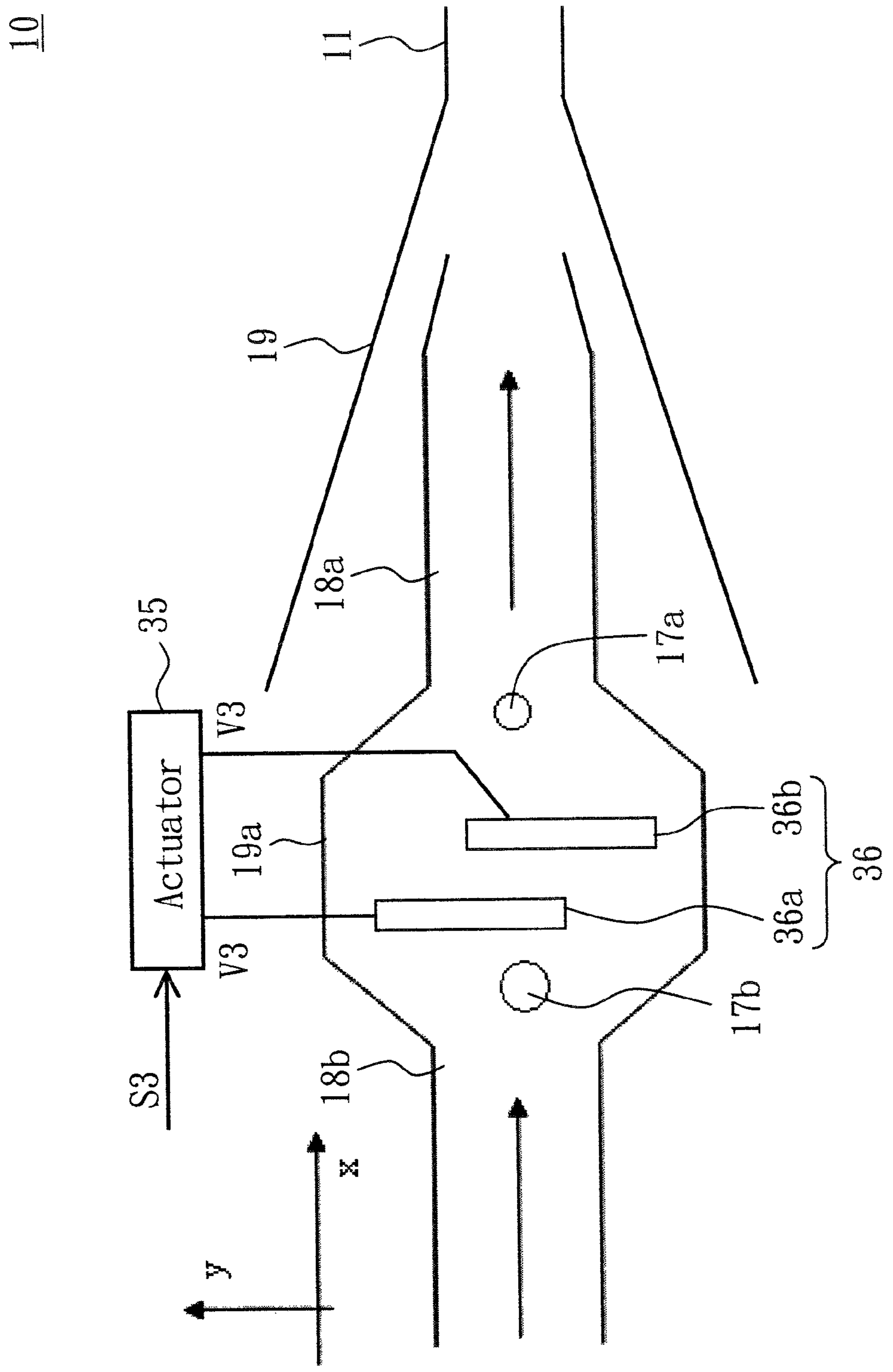
FIG. 5A is a top view of a filtering channel and a sorting channel of the invention.
Figure 5C:
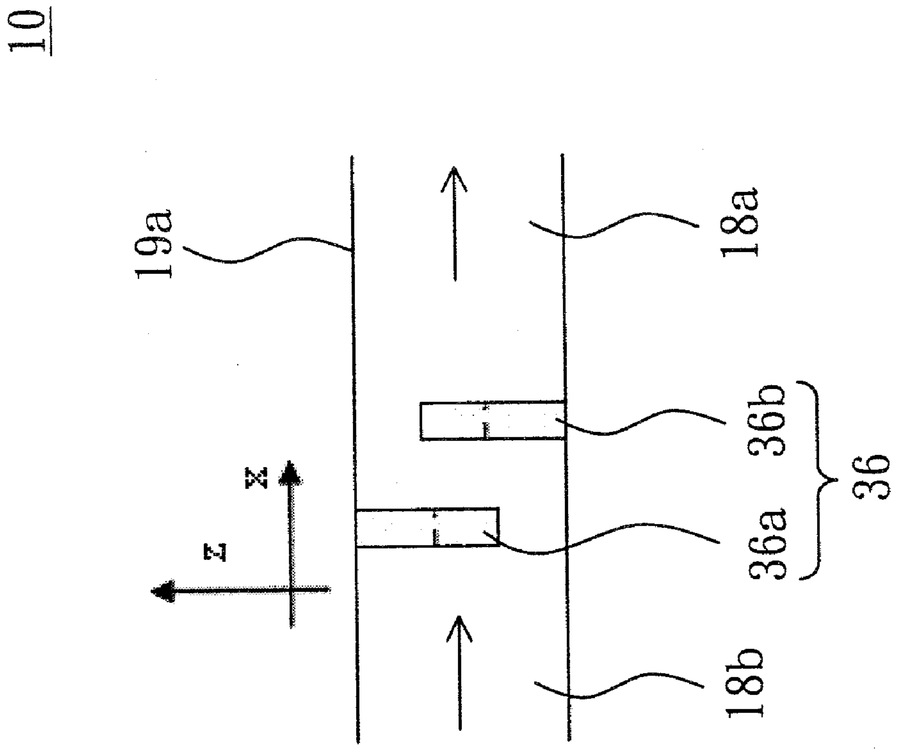
FIG. 5C is a transversal view of the filtering channel.
Figure 5B:
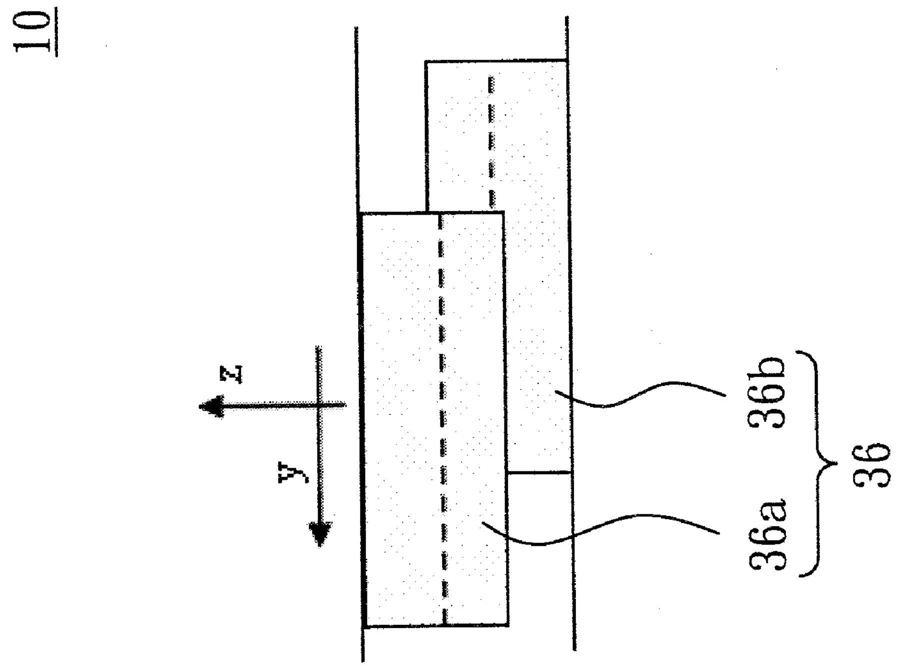
FIG. 5B is a longitudinal view of the filtering channel.

The filtering design of the filtering channel 19 is exemplified below with accompanied drawings. However, the technology of the present embodiment of the invention is not limited thereto. Referring to both FIGS. 5A~5C, FIG. 5A is a top view of a filtering channel and a sorting channel of the invention, FIG. 5B is a longitudinal view of the filtering channel, and FIG. 5C is a transversal view of the filtering channel. As indicated in FIG. 5A~5C, the fluid particle separating device 10 further includes an actuator 35 and a sieving valve 36. The sieving valve 36 is deformable and disposed inside the middle channel 19*a* of the filtering channel 19. The actuator 35 receives a particle distribution signal S3 containing the information of the distribution range of the particles in the fluid 18*b*. The actuator 35 then controls the deformation of the sieving valve 36 according to the distribution range of the particles of the fluid 18*b* such that the particles 17*a* and 17*b* pass through the filtering channel 19 to enter the sorting channel 11. In the present embodiment of the invention, the actuator 35 receives a particle distribution signal S3 and then outputs a voltage V3 accordingly. The sieving valve 36, disposed inside the middle channel 19*a* of the filtering channel 19 with the volume of the sieving valve 36 being expanded or the thickness thereof being increased, is electrically connected to the actuator 35. After the sieving valve 36 receives the voltage V3, the volume of the sieving valve 36 is expanded or the thickness thereof is increased for enabling the particles 17*a* and 17*b* to pass through the filtering channel 19 to enter the sorting channel 11. The sieving valve 36 includes the valve portions 36*a* and 36*b* electrically connected to the actuator 35 respectively. Thus, as the actuator 35 outputs the voltage V3 to the valve portions 36*a* and 36*b* respectively, the volume of the valve portions 36*a* and 36*b* is expanded or the thickness thereof is increased for filtering unwanted impurities whose size is large than the particles 17*a* and 17*b*. Suitable filtering dimension for the sieving valve 36 in the invention can be pre-determined according to the characteristics of the fluid (for example, the neutral fluid, the non-neutral fluid or the electrolyte) and the size of the particles to be collected so as to reduce the influence of the impurities in the fluid on the accuracy of subsequent process of ranking and sorting the particles. For example, the relative position and inter-space between the valve portions 36*a* and 36*b* and the deformation thereof can be pre-determined. Furthermore, the valve portions 36*a* and 36*b* can be a double-layered structure formed by the conductive macromolecule layer and the electrolytic layer, a three-layered structure formed with an electrolytic layer being sandwiched by two conductive macromolecule layers, or a structure formed with a conductive macromolecule layer being embedded in the electrolyte solution. The valve portions 36*a* and 36*b* can have the same or different structure. The sieving valve 36 can be made from an elastic deformable material, such that the actuator 35 can control the deformation of the sieving valve 36 in the way of using mechanical force.

Second Embodiment

Figure 6A:
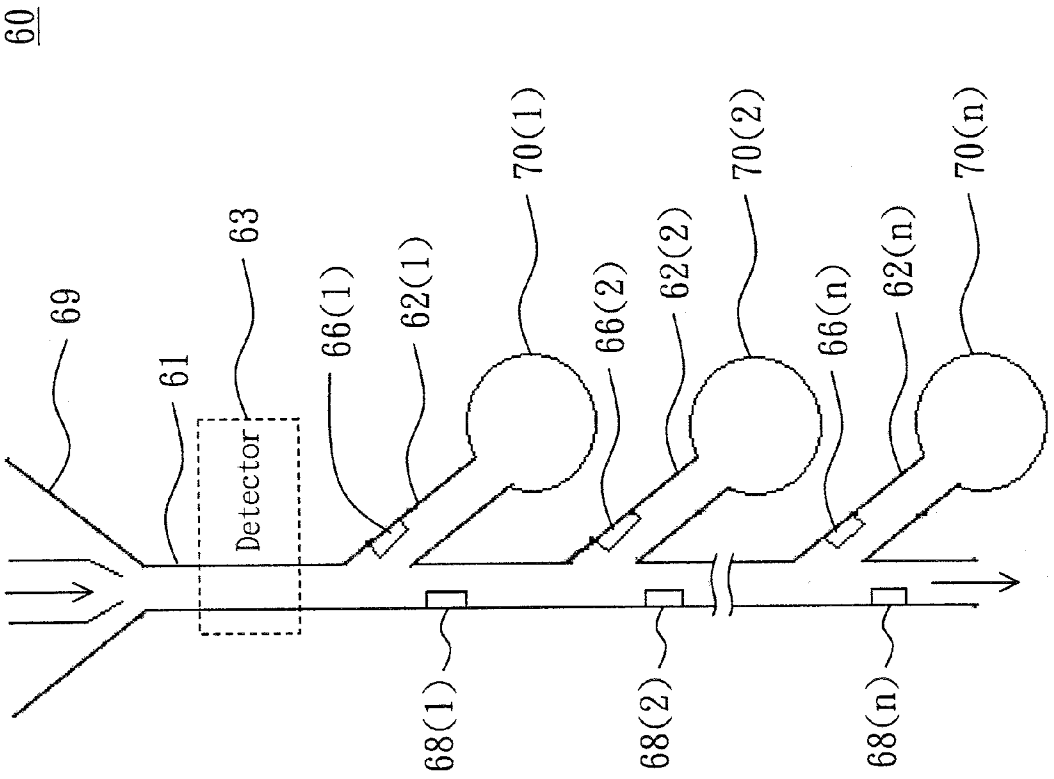
FIG. 6A is a perspective of a fluid particle separating device according to a second embodiment of the invention.
Figure 6B:
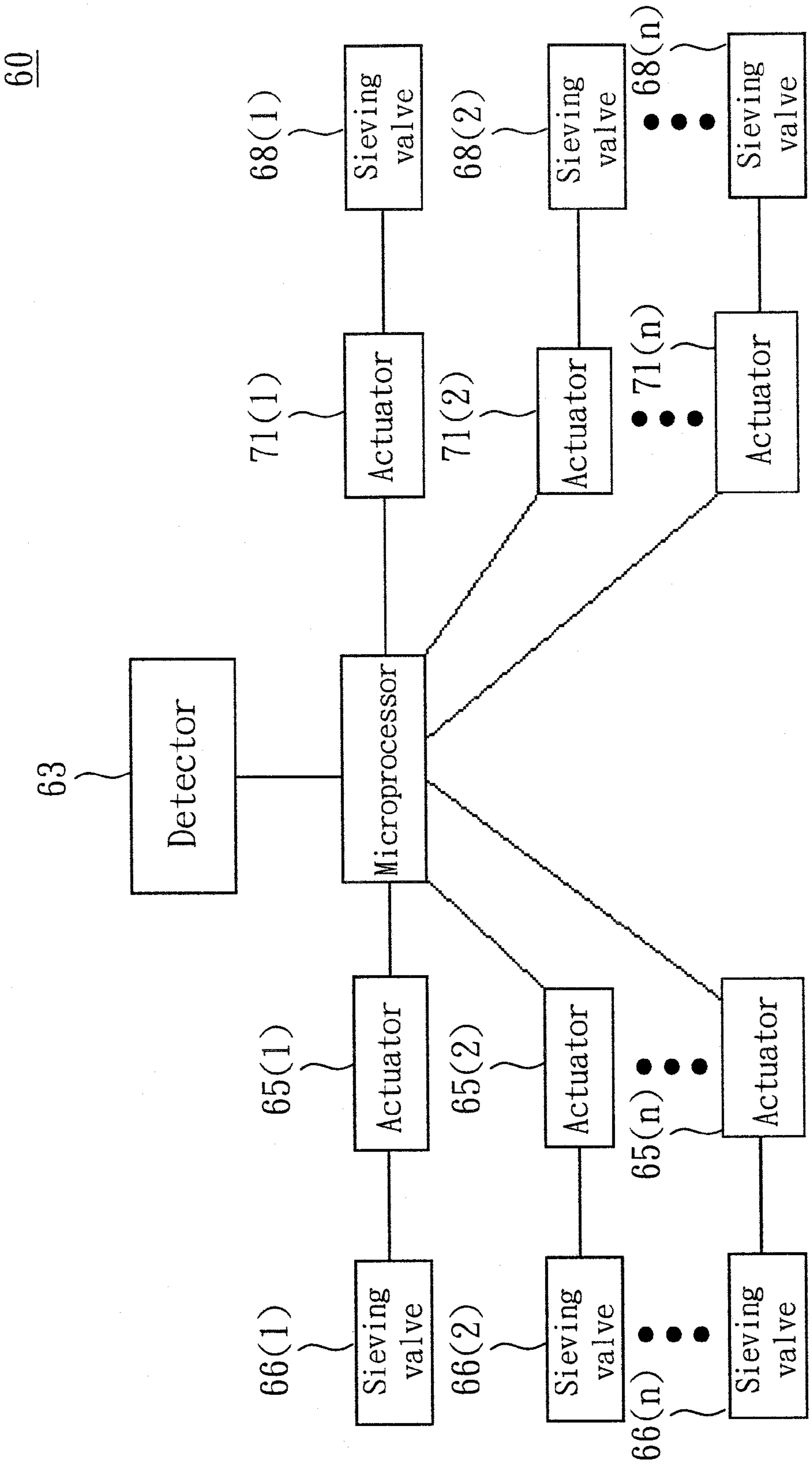
FIG. 6B is a circuit block diagram of a fluid particle separating device according to a second embodiment of the invention.

Referring to both FIGS. 6A~6B, FIG. 6A is a perspective of a fluid particle separating device according to a second embodiment of the invention, FIG. 6B is a circuit block diagram of a fluid particle separating device according to a second embodiment of the invention. As indicated in FIGS. 6A~6B, the fluid particle separating device 60 includes a filtering channel 69, a sorting channel 61, a plurality of diverting channels 62(1)~62(*n*), a detector 63, a microprocessor 64, a plurality of actuators 65(1)~65(*n*) and 71(1)~71(*n*), a plurality of sieving valves 66(1)~66(*n*) and 68(1)~68(*n*) and a plurality of containers 70(1)~70(*n*), wherein n is a positive integer larger than 2. The filtering channel 69 receives and filters a first fluid, and outputs a second fluid, wherein the second fluid contains a plurality of particles whose sizes are different. The sorting channel 61 is connected to the filtering channel 69 for receiving the second fluid and guiding the second particles of a fluid to sequentially pass through the sorting channel. One ends of the diverting channels 62(1)~62(*n*) are respectively connected to the sorting channel 61, and the other ends of the diverting channels 62(1)~62(*n*) are correspondingly connected to the containers 70(1)~70(*n*). That is, the diverting channels 62(1)~62(*n*) are sequentially arranged at one side of the sorting channel 61, and the containers 70(1)~70(*n*) are also sequentially arranged. The containers 70(1)~70(*n*) are for correspondingly collecting the first type to the $n^{th}$ type of particles. The detector 63 is disposed around the sorting channel 61 and forms a detecting area (depicted in dotted line) inside the sorting channel 61 for recognizing the sizes and numbers of the particles passing through. The microprocessor 64 is electrically connected to the detector 63, and the actuators 65(1)~65(*n*) and 71(1)~71(*n*) are electrically connected to the microprocessor 64 respectively. The sieving valves 66(1)~66(*n*) are deformable and correspondingly disposed inside the diverting channels 62(1)~62(*n*) and are correspondingly and electrically or mechanically connected to the actuators 65(1)~65(*n*). The sieving valves 68(1)~68(*n*) are deformable and correspondingly disposed inside the sorting channel 61 and are correspondingly and electrically or mechanically connected to the actuators 71(1)~71(*n*). The sieving valve 68(1) is disposed inside the sorting channel 61 located between the diverting channels 62(1)~62(2). That is, the sieving valve 68(*i*) is disposed inside the sorting channel 61 located between the diverting channels 62(*i*)~62(*i*+1), wherein i is a positive integer ranging from 1~n.

When the detector 63 recognizes the first particle, the detector 63 outputs a first recognition signal to the microprocessor 64. The microprocessor 64 outputs a first control signal to the actuator 71(1) according to the first recognition signal. The actuator 71(1) controls the deformation of the sieving valve 68(1) according to the first control signal such that the first particle enters the container 70(1) via the diverting channel 62(1). In the present embodiment of the invention, the actuator 71(1) outputs a first voltage to the sieving valve 68(1) according to the first control signal for expanding the volume of the sieving valve 68(1) or increasing the thickness thereof such that the first particle enters the container 70(1) via the diverting channel 62(1).

Similarly, when the detector 63 recognizes the second particle, the detector 63 outputs a second recognition signal to the microprocessor 64. The microprocessor 64 outputs a second control signal to the actuators 71(2) and 65(1) according to the second recognition signal. The actuators 71(2) and 65(1) respectively control the deformation of the sieving valves 68(2) and 66(1) according to the second control signal correspondingly such that the second particle enters the container 70(2) via the diverting channel 62(2). In the present embodiment of the invention, the actuators 71(2) and 65(1) respectively output a second voltage to the sieving valves 68(2) and 66(1) according to the second control signal for expanding the volume of the sieving valves 68(2) and 66(1) or increasing the thickness thereof such that the second particle enters the container 70(2) via the diverting channel 62(2).

Likewise, a particle sieving process (except the first particle) is designed and stated below. When the detector 63 recognizes the $(j+1)^{th}$ particle, the detector 63 outputs a $(j+1)^{th}$ recognition signal to the microprocessor 64. The microprocessor 64 outputs a $(j+_1)^{th}$ control signal to the actuators 71(*j*+1) and 65(1)~65(*j*) according to the $(j+1)^{th}$ recognition signal. The actuators 71(*j*+1) and 65(1)~650) correspondingly control the deformation of the sieving valves 68(*j*+1) and 66(1)~660) according to the $(j+1)^{th}$ control signal correspondingly such that the $(j+1)^{th}$ particle enters the container 70(*j*+1) via the diverting channel 62(*j*+1), wherein j is a positive integer ranging from 1~n. In the present embodiment of the invention, the actuators 71(*j*+1) and 65(1)~65(*j*) correspondingly output a $(j+1)^{th}$ voltage to the sieving valves 68(*j*+1) and 66(1)~66(*j*) according to the $(j+1)^{th}$ control signal for expanding the volume of the sieving valves 68(*j*+1) and 66(1)~66(*j*) or increasing the thickness thereof such that the $(j+1)^{th}$ particle enters the container 70(*j*+1) via the diverting channel 62(*j*+1).

It is noted that each of the sieving valves 66(1)~66(*n*) and 68(1)~68(*n*) can be a double-layered structure formed by the conductive macromolecule layer and the electrolytic layer, a three-layered structure formed with an electrolytic layer being sandwiched by two conductive macromolecule layers, a structure formed with a conductive macromolecule layer being embedded in the electrolyte solution or a structure formed by two or more than two valve portions. The valve portion can be a double-layered structure formed by the conductive macromolecule layer and the electrolytic layer, a three-layered structure formed with an electrolytic layer being sandwiched by two conductive macromolecule layers, or a structure formed with a conductive macromolecule layer being embedded in the electrolyte solution. The sieving valves 66(1)~66(*n*) and 68(1)~68(*n*) can be made from an elastic deformable material, such that the actuators 65(1)~65(*n*) and 71(1)~71(*n*) control the deformation of the sieving valves 66(1)~66(*n*) and 68(1)~68(*n*) by way of using mechanical force. The sieving valves 66(1)~66(*n*) and 68(1)~68(*n*) can have the same or different structures. Besides, the structure of the valve portion of the same sieving valve can be the same or different.

To summarize, the fluid particle separating device disclosed in the above embodiments has a sorting channel for the fluid and a container, wherein the sorting channel and the container are connected by diverting channels. A sieving valve is disposed inside a diverting channel or a sorting channel between two diverting channels. The sieving valve is a double-layered structure formed by the conductive macromolecule layer and the electrolytic layer, a three-layered structure formed with an electrolytic layer being sandwiched by two conductive macromolecule layers, a structure formed with a conductive macromolecule layer being embedded in the electrolyte solution or a structure formed by two or more than two valve portions and can be made from an elastic deformable material. The valve portion can also be a double-layered structure formed by the conductive macromolecule layer and the electrolytic layer, a three-layered structure formed with an electrolytic layer being sandwiched by two conductive macromolecule layers, or a structure formed with a conductive macromolecule layer being embedded in the electrolyte solution. The sieving valve driven by the above actuator controls the particles that are allowed to pass through the sorting channel. When the particles of the fluid enter the diverting channel via the sorting channel, if the above control valve is conductive and includes conductive macromolecule for example, then the sieving valve is regarded as an electrode. If an external circuit is provided, the sieving valve can be used for measuring the sizes and counting the number of the particles according to the Coulter theory. The containers can receive particles of different sizes. Lastly, the distribution of the particles in the fluid for a period of time is obtained according to the sorting and calculating function of the microprocessor.

It is noted that, according to the flowing characteristics of the middle fluid and the fluid focus effect of the fast sheath fluid at the two sides at the entrance of the sorting channel (the connecting end between the sorting channel and the filtering channel), the fluid particle separating device of the present embodiment of the invention sequentially guides the particles in the middle fluid to enter the sorting channel. Then, in the middle of the sorting channel, the sizes and numbers of the particles are detected by ways of electrical, magnetic or optical function of the detector. Lastly, the sieving valve at the rear end of the diverting channel enables the particles of specific sizes to be collected to a predetermined container.

Furthermore, the particle separating device disclosed in the present embodiment of the invention is applicable to the analysis of the distribution of the size of homogenic cells or particles. As the concentration of the fluid having ordinary cells or particles is already lowered, the detector recognizes single cell or particle monomer individually after the cell or particle passes through the sorting channel. The particle separating device disclosed in the present embodiment of the invention is also applicable to the analysis and recognition of xenogenic cells or particles.

Thus, the present embodiment of the invention provides a fluid particle separating device for sorting particles that have different physical or chemical characteristics. With the design of an elastic and deformable sieving valve, the above particles are respectively guided into different containers and are sorted accordingly. Besides, the particle separating technologies in the present embodiment of the invention are applicable to sorting the components in the blood or body fluid, measuring the qualities of different cells in the blood, or filtering the particles and impurities contained in the body fluid. Moreover, the fluid particle separating device disclosed in the present embodiment of the invention possesses specific functions. The fluid particle separating device sorts the particles in a fluid by recognizing the sizes of the particles and controlling the deformation of a sieving valve. Furthermore, according to the location of the sieving valve, the characteristics of the particle are determined and the impurities in the fluid are filtered.

The fluid particle separating device disclosed in the present embodiment of the invention is indeed capable of filtering, recognizing, and sorting the particles and impurities in a fluid according to the location and material chosen for the sieving valve.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fluid particle separating device, comprising:

a sorting channel used for receiving a first fluid containing a first particle and a second particle, wherein the first particle and the second particle sequentially pass through the sorting channel;

a first diverting channel connected to the sorting channel for guiding the first particle;

a second diverting channel connected to the sorting channel for guiding the second particle;

a detector disposed around the sorting channel for sequentially recognizing the sizes and numbers of the first particle and the second particle and accordingly outputting a first recognition signal and a second recognition signal;

a microprocessor electrically connected to the detector for sequentially receiving the first recognition signal and the second recognition signal and accordingly outputting a first control signal and a second control signal;

a first sieving valve deformable and disposed inside the first diverting channel for allowing the first particle to pass through the first diverting channel;

a second sieving valve deformable and disposed inside the second diverting channel for allowing the second particle to pass through the second diverting channel, wherein the first sieving valve and the second sieving valve each comprises:

at least one conductive macromolecule layer, including polypyrrole (PPy), polyaniline (PAn), polysulfone or polyacetylene (PAc); and at least one electrolytic layer, including dodecylbenzene sulfonic acid ions, perchloric acid ions or benzene sulfonic acid ions;

a first actuator electrically connected to the microprocessor for receiving the first control signal and accordingly controlling the deformation of the second sieving valve such that the first particle can not pass through the second diverting channel; and a second actuator electrically connected to the microprocessor for receiving the second control signal and accordingly controlling the deformation of the first sieving valve such that the second particle can not pass through the first diverting channel.

2. The device according to claim 1, wherein the first sieving valve and the second sieving valve each comprises the two conductive macromolecule layers, and the electrolytic layer is sandwiched between the two conductive macromolecule layers.

3. The device according to claim 1, wherein the second sieving valve comprises a first conductive macromolecule layer, a first electrolytic layer, a second conductive macromolecule layer and a second electrolytic layer, the first conductive macromolecule layer and the first electrolytic layer are disposed opposite to the second conductive macromolecule layer and the second electrolytic layer, the first actuator is for outputting a first voltage to the first conductive macromolecule layer and the first electrolytic layer as well as the second conductive macromolecule layer and the second electrolytic layer.

4. The device according to claim 1, wherein the first sieving valve comprises a first conductive macromolecule layer, a first electrolytic layer, a second conductive macromolecule layer and a second electrolytic layer, the first conductive macromolecule layer and the first electrolytic layer are disposed opposite to the second conductive macromolecule layer and the second electrolytic layer, and the second actuator is for outputting a second voltage to the first conductive macromolecule layer and the first electrolytic layer as well as the second conductive macromolecule layer and the second electrolytic layer.

5. The device according to claim 1, wherein the detector recognizes the sizes of the first particle and the second particle and outputs a particle count that is 2.

6. The device according to claim 1, further comprising:

a first container connected to the first diverting channel for receiving the first particle; and a second container connected to the second diverting channel for receiving the second particle.

7. The device according to claim 1, wherein the first sieving valve and the second sieving valve each comprises an elastic deformable material.

8. The device according to claim 1, wherein the detector is a Coulter counter.

9. The device according to claim 1, further comprising:

a filtering channel connected to the sorting channel for receiving and filtering a second fluid and outputting the first fluid.

10. The device according to claim 9, wherein the sorting channel enables the first particle and the second particle to sequentially enter the sorting channel by means of fluid focus effect.

11. The device according to claim 9, further comprising:

a third sieving valve deformable and disposed inside the filtering channel; and a third actuator electrically connected to the third sieving valve for controlling the deformation of the third sieving valve according to the distribution range of the particles of the second fluid such that the first particle and the second particle pass through the filtering channel to enter the sorting channel.

12. The device according to claim 11, wherein the third sieving valve comprises a first conductive macromolecule layer, a first electrolytic layer, a second conductive macromolecule layer and a second electrolytic layer, the first conductive macromolecule layer and the first electrolytic layer are disposed opposite to the second conductive macromolecule layer and the second electrolytic layer, and the third actuator is for outputting a third voltage to the first conductive macromolecule layer and the first electrolytic layer as well as the second conductive macromolecule layer and the second electrolytic layer.

13. A fluid particle separating device, comprising:

a sorting channel used for receiving a first fluid containing a first particle and a second particle, wherein the first particle and the second particle sequentially pass through the sorting channel;

a first diverting channel connected to the sorting channel for guiding the first particle;

a second diverting channel connected to the sorting channel for guiding the second particle;

a detector disposed around the sorting channel for sequentially recognizing the sizes and numbers of the first particle and the second particle and accordingly outputting a first recognition signal and a second recognition signal;

a microprocessor electrically connected to the detector for sequentially receiving the first recognition signal and the second recognition signal and accordingly outputting a first control signal and a second control signal;

a first sieving valve deformable and disposed inside the first diverting channel for allowing the first particle to pass through the first diverting channel;

a second sieving valve deformable and disposed inside the second diverting channel for allowing the second particle to pass through the second diverting channel;

wherein the first sieving valve and the second sieving valve each comprises two conductive macromolecule layers and an electrolytic layer, and the electrolytic layer is sandwiched between the two conductive macromolecule layers;

a first actuator electrically connected to the microprocessor for receiving the first control signal and accordingly controlling the deformation of the second sieving valve such that the first particle can not pass through the second diverting channel; and a second actuator electrically connected to the microprocessor for receiving the second control signal and accordingly controlling the deformation of the first sieving valve such that the second particle can not pass through the first diverting channel.

14. A fluid particle separating device, comprising:

a sorting channel used for receiving a first fluid containing a first particle and a second particle, wherein the first particle and the second particle sequentially pass through the sorting channel;

a first diverting channel connected to the sorting channel for guiding the first particle;

a second diverting channel connected to the sorting channel for guiding the second particle;

a detector disposed around the sorting channel for sequentially recognizing the sizes and numbers of the first particle and the second particle and accordingly outputting a first recognition signal and a second recognition signal;

a microprocessor electrically connected to the detector for sequentially receiving the first recognition signal and the second recognition signal and accordingly outputting a first control signal and a second control signal;

a first sieving valve deformable and disposed inside the first diverting channel for allowing the first particle to pass through the first diverting channel;

a second sieving valve deformable and disposed inside the second diverting channel for allowing the second particle to pass through the second diverting channel;

wherein the second sieving valve comprises a first conductive macromolecule layer, a first electrolytic layer, a second conductive macromolecule layer and a second electrolytic layer, the first conductive macromolecule layer and the first electrolytic layer are disposed opposite to the second conductive macromolecule layer and the second electrolytic layer;

a first actuator electrically connected to the microprocessor for receiving the first control signal and accordingly controlling the deformation of the second sieving valve such that the first particle can not pass through the second diverting channel, wherein the first actuator is for outputting a first voltage to the first conductive macromolecule layer and the first electrolytic layer as well as the second conductive macromolecule layer and the second electrolytic layer; and a second actuator electrically connected to the microprocessor for receiving the second control signal and accordingly controlling the deformation of the first sieving valve such that the second particle can not pass through the first diverting channel.

15. A fluid particle separating device, comprising:

a sorting channel used for receiving a first fluid containing a first particle and a second particle, wherein the first particle and the second particle sequentially pass through the sorting channel;

a first diverting channel connected to the sorting channel for guiding the first particle;

a second diverting channel connected to the sorting channel for guiding the second particle;

a detector disposed around the sorting channel for sequentially recognizing the sizes and numbers of the first particle and the second particle and accordingly outputting a first recognition signal and a second recognition signal;

a microprocessor electrically connected to the detector for sequentially receiving the first recognition signal and the second recognition signal and accordingly outputting a first control signal and a second control signal;

a first sieving valve deformable and disposed inside the first diverting channel for allowing the first particle to pass through the first diverting channel;

a second sieving valve deformable and disposed inside the second diverting channel for allowing the second particle to pass through the second diverting channel, wherein at least one of the first sieving valve and the second sieving valve comprises:

a conductive macromolecule layer; and an electrolytic layer, including dodecylbenzene sulfonic acid ions, perchloric acid ions or benzene sulfonic acid ions;

a first actuator electrically connected to the microprocessor for receiving the first control signal and accordingly controlling the deformation of the second sieving valve such that the first particle can not pass through the second diverting channel; and a second actuator electrically connected to the microprocessor for receiving the second control signal and accordingly controlling the deformation of the first sieving valve such that the second particle can not pass through the first diverting channel.

* * * * *